United States Patent [19]

Hashimoto

[11] Patent Number: 4,462,553
[45] Date of Patent: Jul. 31, 1984

[54] ENDLESS CASSETTE TAPE FOR VIDEO TAPE RECORDER

[75] Inventor: Kazuo Hashimoto, Tokyo, Japan

[73] Assignee: Hashimoto Corporation, Tokyo, Japan

[21] Appl. No.: 368,462

[22] Filed: Apr. 14, 1982

[30] Foreign Application Priority Data

Jun. 4, 1981 [JP] Japan .............................. 56-86025

[51] Int. Cl.³ .............................................. G11B 23/06
[52] U.S. Cl. ................................. 242/55.19 A; 360/93
[58] Field of Search ............... 242/55.19 R, 55.19 A, 242/55.16; 360/85, 93, 95, 132; 352/126, 127, 128

[56] References Cited

U.S. PATENT DOCUMENTS

| | | | |
|---|---|---|---|
| 2,995,313 | 8/1961 | Namenyi-Katz | 242/55.16 X |
| 3,587,991 | 6/1971 | Stark | 242/55.16 |
| 3,861,611 | 1/1975 | Esashi et al. | 360/93 X |
| 3,913,857 | 10/1975 | Threlkeld | 242/55.19 A |
| 4,020,999 | 5/1977 | Camras | 242/55.19 |

Primary Examiner—Stuart S. Levy
Assistant Examiner—David Werner
Attorney, Agent, or Firm—Lowe, King, Price & Becker

[57] ABSTRACT

An endless cassette tape for a video tape recorder has a length which is the sum of the length of the outer rim of a section including a supply reel and a take-up reel and at least the length of the slack part for a tape loading to an outer component in a tape loading mode. The endless tape is wrapped on a reel hub on one of which a special tape hook pin is mounted. The tape hook pin hooks the slack part of the endless tape and absorbs it completely in cooperation with a reel mechanism in the tape unloading mode and release the slack part of the tape in the tape loading mode.

6 Claims, 8 Drawing Figures

ENDLESS CASSETTE TAPE FOR VIDEO TAPE RECORDER

BACKGROUND OF THE INVENTION

The present invention relates to an endless cassette tape for a video tape recorder (to be referred to as a VTR hereinafter).

Two types of cassette tapes are currently used for VTRs throughout the world: cassette tapes of the Betamax system and of the VHS system.

In a VHS cassette tape, as shown in FIG. 1, a video tape 4 is wound around a supply reel 2 and a take-up reel 3 arranged inside a cassette 1. When cassette 1 is loaded (to be referred to as automatically loaded hereinafter), the front cover of the cassette automatically opens as shown in FIG. 2. Through this opening, video tape 4 is drawn outside the cassette by means of a movement guide post 5 guiding the video tape, conical guides 6 and 7, a movement guide post 8, and a capstan 9. The part of video tape 4 drawn out of cassette 1 (to be referred to as a slack part) is threaded past a full-width erase head 10, a roller 11, a video head 12, a roller 13, an audio head 14, and a pinch roller 15. Then, video tape 4 is driven at normal speed by the pinching action between the capstan and the pinch roller. In FIG. 2, reference numerals 16 and 17 denote tension posts; 18 and 19, guide poles; 20, a spring plate; and 21, a pad plate.

When the eject button is depressed, video tape 4 is taken up completely by supply reel 2 in the direction indicated by a dotted arrow while movement guide post 5, conical guides 6 and 7, movement guide post 8, and capstan 9 return to the positions shown in FIG. 1. When the slack part is completely wound onto supply reel 2, the front cover of the cassette automatically closes. Then, cassette 1 is disengaged from a reel spindle and can be ejected.

In a Betamax cassette, as shown in FIG. 3, a video tape 24 is wound around a supply reel 22 and a take-up reel 23 arranged inside a cassette 35. When tape 24 is automatically loaded, the front cover of cassette 35 automatically opens as shown in FIG. 4. Then, video tape 24 is drawn out of cassette 35 by movement guide posts 25 and 26 guiding the tape, a capstan 27, and a guide post 28. Thus, the slack part of video tape 24 is formed. Tape 24 is brought into contact with a full-width erase head 29, a video head 30 and an audio head 31 to start travelling at normal speed. When the eject button is depressed, video tape 24 is taken up by take-up reel 23 while movement guide posts 25 and 26, capstan 27 and guide post 28 return to their original positions shown in FIG. 3. When the slack part of video tape 24 is completely taken up, the front cover automatically closes. Thereafter, cassette 35 can be disengaged from a reel spindle and can be ejected outside the VTR. Referring to FIG. 4, a loading ring 32 serves as a mount for guide post 26, capstan 27, and guide post 28. Tape guide posts 33 and 34 are also mounted on loading ring 32.

As may be seen from a comparison of the figures, the length of the slack part of the video tape which is drawn outside the cassette and which is originally kept taut between the two reels in the cassette significantly differs from the Betamax type to the VHS type.

In a cassette of the Betamax system, the slack part assumes an omega shape in plan view and the length thereof exceeds about 40 cm. However, in a cassette of the VHS type, the slack part is M-shaped in plan view with a length of about 25 cm. The basic structures and the tape suspending mechanisms are significantly different in cassettes of the Betamax system and the VHS system.

To house an endless tape of ½ inch width in a cassette of the type wherein the slack part must be automatically eliminated before ejection of the cassette, a totally new mechanism must be adopted which is different from that widely used for cassettes of endless tapes of ¼ inch width or less.

In an endless tape cassette of ¼ inch width or less of known type, the portion of the tape at the inner periphery of the tape coil is drawn out to pass it past the recording and reproducing parts, and is then wound around the outer periphery of the tape coil. This inevitably results in a structure wherein the drawing part of the tape and each turn of the tape coil cross each other in a stepped form. Due to this structure, it has been impossible to draw the video tape outside the cassette and to automatically take up the slack part thus formed by pivotal movement of the take-up reel.

SUMMARY OF THE INVENTION

It is an object of the present invention to provide an endless cassette tape for a video tape recorder wherein the drawing part of a video tape and each turn of the wound tape coil may not cross each other in a stepped form, the tape drive resistance and wow and flutter may be reduced to a minimum, damage to the video tape may be reduced to the minimun, a service life of the video tape may be prolonged, and the cassette tape may be conveniently used for a VTR.

It is another object of the present invention to provide an endless cassette tape for a video tape recorder wherein, during endless recording with a cassette in a VTR, the recorded information may be reproduced within 20 to 30 seconds after depression of a playback button and the recorded information may be repeatedly reproduced as needed. For example, a VTR with a cassette tape of the present invention loaded may be installed at a sheet intersection or the like where traffic is heavy. The VTR is maintained in a condition of constant recording. When a traffic accident or the like occurs, the VTR may be immediately switched to the playback mode so that the scene from 20 to 30 seconds before the traffic accident may be reproduced. Then, the conditions of the accident may be easily determined.

In order to achieve these objects, the present invention comprises an endless cassette tape for a video tape recorder having a supply reel and a take-up reel in a lower half of a cassette housing for housing a video tape, wherein a tape hook pin is mounted to one of the reels to guide the tape between the tape hook pin of the reel and a reel hub thereof, so that the length of the tape hooked by the tape hook pin may be greater than a tape slack part during operation, and the slack part of the tape may be completely wound on the reel before ejecting the cassette.

DETAILED DESCRIPTION OF THE PREFERRED EMBODIMENTS

Figure 5:
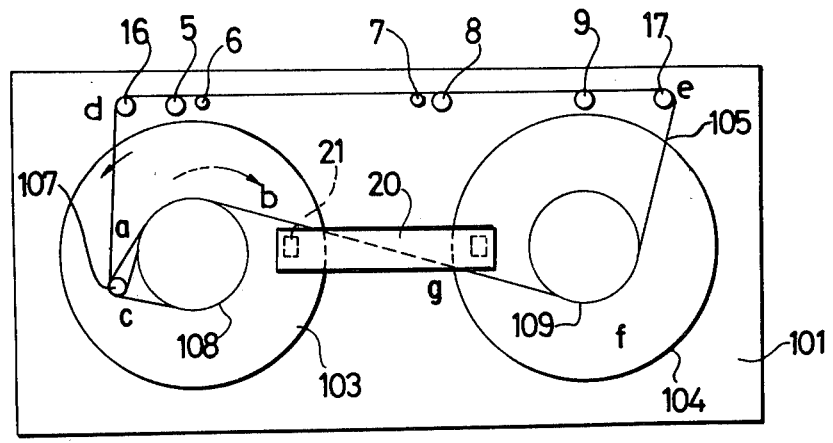
FIG. 5 is a schematic plan view showing the interior of an endless cassette tape according to an embodiment of the present invention as loaded on a VTR.

FIG. 5 shows an endless cassette tape for a VTR according to an embodiment of the present invention. A lower part 101 (to be referred to as a lower half) of a cassette housing accommodates the video tape. A supply reel 103 and a take-up reel 104 are arranged inside lower half 101.

A tape hook pin 107 is mounted on the supply reel 103. An endless video tape 105 passes between the tape hook pin 107 and a reel hub 108 and is wrapped onto reel hub 108 and on a reel hub 109 of the take-up reel 104.

Video tape 105 passes from start point a between tape hook pin 107 and reel hub 108. Through points b, c, d, e, f and g, video tape 105 then returns to point a where the start point and the terminal point of the tape merge. In this manner, the endless video tape is defined and is completely accommodated within the cassette housing, that is, the upper and lower halves. Endless video tape 105 has a length which is the sum of the length of the outer rim of the section including take-up reel 104 and supply reel 103 and at least the length of the slack part during automatic loading.

Figure 1:
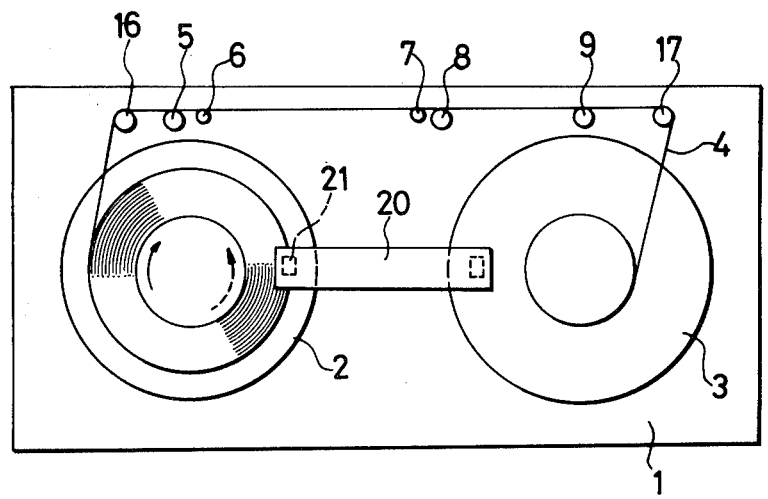
FIG. 1 is a schematic plan view showing the interior of a cassette tape of the VHS system loaded on a VTR.
Figure 2:
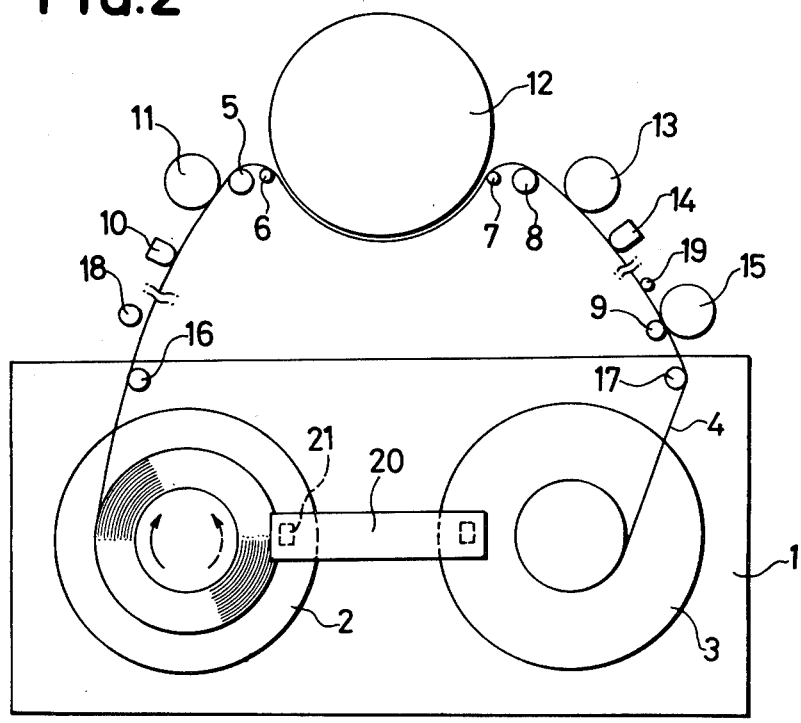
FIG. 2 is a schematic plan view showing the driving state of the video tape of FIG. 1.
Figure 3:
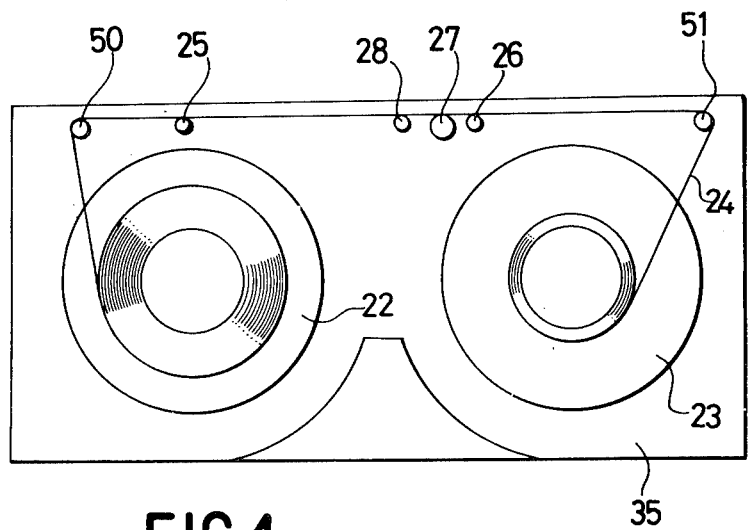
FIG. 3 is a schematic plan view showing the interior of a cassette tape of the Betamax system loaded on a VTR.
Figure 4:
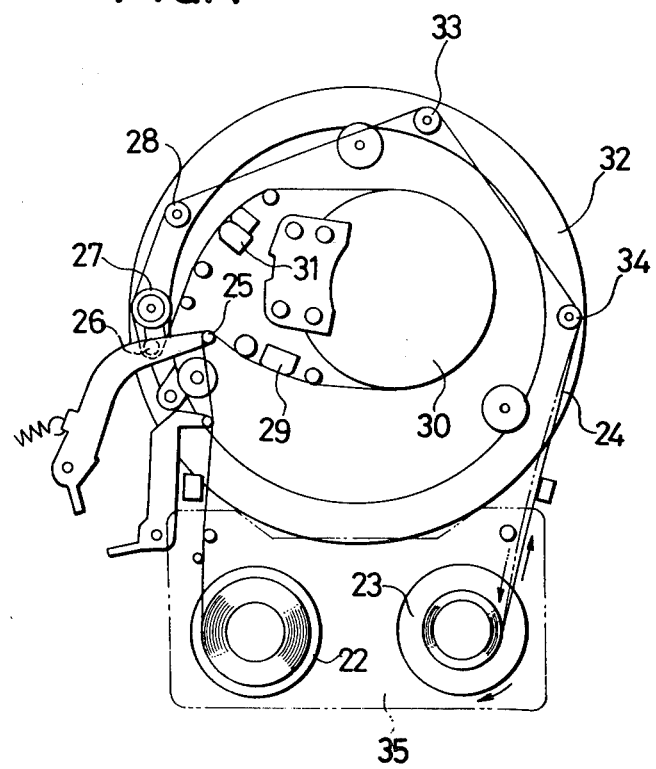
FIG. 4 is a schematic plan view showing the driving state of the video tape of FIG. 3.
Figure 6:
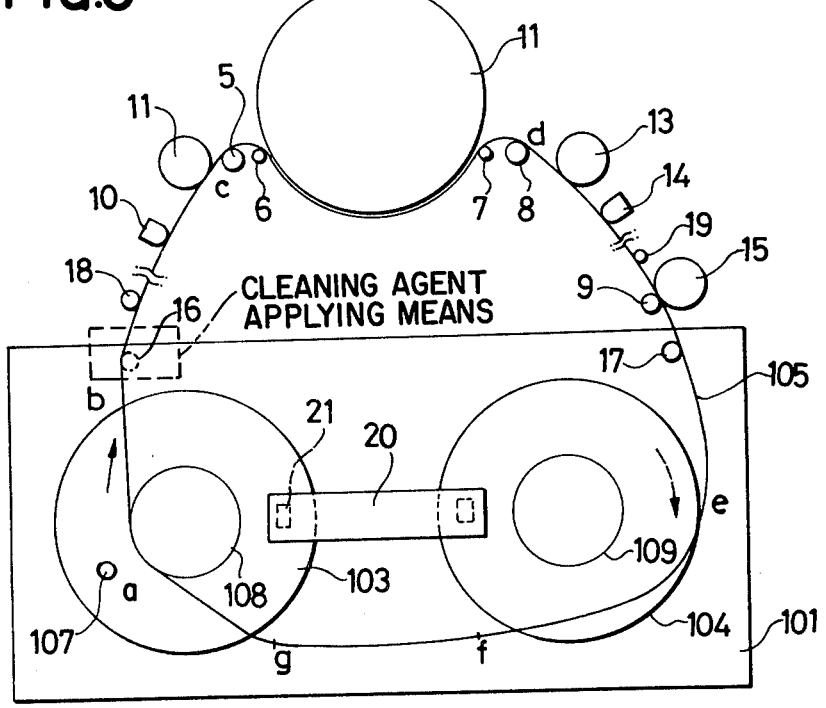
FIG. 6 is a schematic plan view showing the driving state of the video tape of FIG. 5.

FIG. 6 shows the state of automatic loading as in the case of FIG. 2, wherein endless video tape 105 is drawn out of the cassette by means of movement guide post 5, conical guides 6 and 7, movement guide post 8 and capstan 9. An overlapping part of the tape through points a, b and c is loaded outside the cassette and is driven by capstan 9 and pinch roller 15. During driving, a significant back tension acts on the tape due to the weight of supply reel 103 and the frictional force caused by spring plate 20 or pad plate 21 for adjusting inertia. By this back tension, video tape 105 may be brought into good contact with full-width erase head 10, roller 11 and audio head 14.

The mode of operation of the endless cassette tape for VTR of the present invention will now be described.

The endless cassette tape of the present invention is inserted in a VTR in a manner similar to that of conventional tapes. The playback button is depressed to perform automatic loading first. Then, the slack part of video tape 105 is formed by movement guide post 5, conical guides 6 and 7, movement guide post 8 and capstan 9. Then, supply reel 103 and take-up reel 104 placed under free conditions pivot as indicated by dotted arrows in FIGS. 5 and 6. The video tape 105 is then brought into contact with full-width erase head 10, roller 11 and audio head 14. Simultaneously, tape 105 is driven by pinching action of pinch roller 15 and capstan 9. Since supply reel 103 is free in this condition, tape 105 is driven by slipping, in the direction of a solid arrow, around pin 107 even if it is brought into contact with the pin inside supply reel 103, as shown in FIG. 6. Thus, video tape 105 can be smoothly driven while being pulled by the pinching force of pinch roller 15 and capstan 9. During this operation, spring plate 20 or pad plate 21 urges the outer surface of the collar portion of supply reel 103 to ensure sufficient contact between the video tape and full-width erase head 10, roller 11 and audio head 14.

To eject the cassette from the VTR, the eject button (not shown) is depressed. Supply reel 103 is then rotated in the opposite (counterclockwise) direction by a gear mechanism (not shown) to eliminate the slack part. In a cassette of the VHS system, tape 105 is wound in the direction indicated by the solid arrow while it is hooked on pin 107, as shown in FIG. 5. Since supply reel 103 is rotated in the direction indicated by the solid arrow by the gear and motor mechanisms, the slack part of the tape can be satisfactorily eliminated. Then, the front cover of the cassette is automatically closed, and the cassette is automatically ejected by a means (not shown), as in a known VTR.

Figure 7:
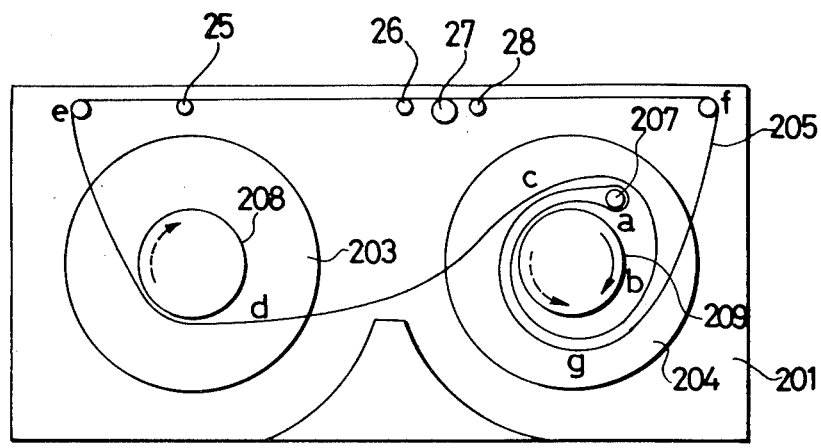
FIG. 7 is a schematic plan view showing the interior of an endless cassette tape according to another embodiment of the present invention as loaded on a VTR.

FIG. 7 shows an endless cassette tape of the Betamax system according to another embodiment of the present invention. Referring to FIG. 7, a lower part 201 (to be referred to as a lower half) of the cassette housing accommodates the tape. A supply reel 203 and a take-up reel 204 are arranged inside lower half 201.

A tape hook pin 207 is mounted on take-up reel 204. An endless video tape 205 passes between tape hook pin 207 and a reel hub 209 and is wrapped onto reel hub 209 and reel hub 208 of supply reel 203.

Video tape 205 passes from start point a between tape hook pin 207 and reel hub 209. Through points b, c, d, e, f and g, the video tape then returns to point a where the start point and the terminal point of the tape merge. In this manner, the endless video tape is defined and is completely accommodated within the cassette, that is, the upper and lower halves. Tape 205 has a length which is the sum of the length of the outer rim of the section including take-up reel 204 and supply reel 203 and at least the length of the slack part during loading.

Figure 8:
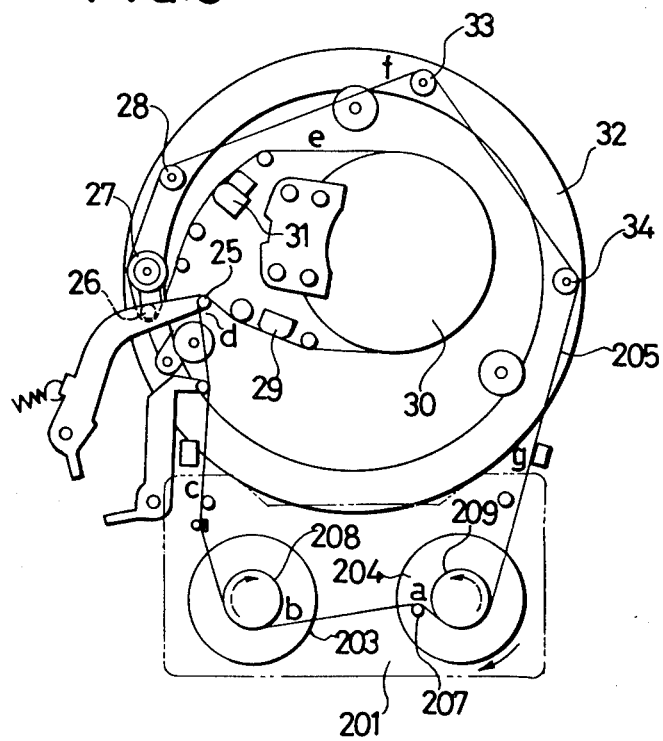
FIG. 8 is a schematic plan view showing the driving state of the video tape of FIG. 7.

FIG. 8 shows the state of automatic loading as in the case of FIG. 2, wherein the endless video tape 205 is drawn out of the cassette by means of movement guide posts 25 and 26, capstan 27 and guide post 28. An overlapping part of the tape through points a, b and c is loaded outside the cassette and is driven by capstan 9 and pinch roller 15.

The mode of operation of the endless cassette tape for VTR of the present invention will now be described.

The endless cassette tape of the present invention is inserted into a VTR in a manner similar to that of conventional tapes. The playback button is depressed to perform automatic loading. Then, the slack part of video tape 205 is formed by movement guide posts 25 and 26, capstan 27 and guide post 28. Then, supply reel 203 and take-up reel 204 are placed under free conditions to pivot as indicated by dotted arrows in FIGS. 7 and 8. Video tape 205 is brought into contact with heads 29, 30 and 31. Take-up reel 204 is rotated in the clockwise direction by a drive means (not shown) through a friction joint (not shown), and pin 207 is brought into contact with video tape 205. However, since tape 205 is taut, the tape is not caught by pin 207 even if take-up reel 204 is rotated in the direction indicated by the solid arrow. Instead, take-up reel 204 is placed in a slip condition relative to the drive means, that is, an idler mechanism. Thus, video tape 205 can be smoothly driven while being pulled by the pinching force of pinch roller 15 and capstan 9 while slipping between pin 207 and reel hub 209.

To eject the cassette from the VTR, the eject button (not shown) is depressed. Supply reel 203 then rotates in the opposite (counterclockwise) direction by a gear mechanism (not shown) to eliminate the slack part. In a cassette of the Betamax system, tape 205 is wound in the direction indicated by the solid arrow while it is hooked on pin 207, as shown in FIG. 7. Since take-up reel 204 pivots in the direction indicated by the solid arrow by the gear and motor mechanisms, the slack part of the tape can be satisfactorily eliminated. Then, the front cover of the cassette is automatically closed, and the cassette is automatically ejected by a means (not shown), as in a known VTR.

According to an endless cassette tape of the present invention, it is possible to incorporate a section for applying a cleaning agent at a position in the cassette housing so that the tape might come in contact therewith. Thus a tape of a material having a cleaning function may be formed in an endless manner and may be housed in the cassette housing in the manner as described above. Then, an endless cassette tape may be used as a cleaning cassette. In a conventional cleaning cassette tape having a cleaning function, ends of the cleaning tape are fixed to both reels. Therefore, once the cleaning tape is driven in the forward direction, it must be manually rewound for performing another cleaning operation. That is, the conventional cleaning cassette tape of this type can perform cleaning only during forward travel. However, in the endless cassette tape of the present invention, since it is mounted in an endless manner, cleaning may be performed at any time by simply inserting the cassette and driving the tape constantly in the forward direction.

What is claimed is:

1. An endless tape cassette for a video tape recorder, comprising a tape supply reel and a take-up reel for supplying and taking up an endless tape, each reel having a reel hub respectively engageable with supply and take-up spindles on the recorder; a tape hook pin mounted on one of said reels, the endless magnetic tape being wrapped on said reel hubs to extend through a space between said tape hook pin and said reel hubs, said endless magnetic tape having a slack length corresponding to at least an amount of tape drawn out from the cassette in a tape loading mode, said endless tape being guided by said reels to smoothly travel in said cassette when said tape is driven, the slack being absorbed at high speed around said reel hubs by said tape hook pin in a tape unloading mode.

2. An endless tape cassette for a video tape recorder according to claim 1, wherein said tape hook pin is mounted on said reel hub engageable with said supply spindle.

3. An endless tape cassette for a video tape recorder according to claim 1, wherein said tape hook pin is mounted on said reel hub engageable with said take-up spindle.

4. An endless tape cassette for a video tape recorder according to claim 1, further including a leaf spring in contact with said reels to prevent reel waving during rotation of said reels.

5. An endless tape cassette for a video tape recorder according to claim 1, further including a felt-like pad in contact with said reels to prevent tape flutter during rotation of said reels.

6. An endless tape cassette for a video tape recorder, comprising a tape supply reel and a take-up reel for supplying and taking up an endless tape, each reel having a reel hub respectively engageable with supply and take-up spindles on the recorder; a tape hook pin mounted on one of said reels, said endless tape being made of a material for cleaning a video tape recorder head and wrapped on said reel hubs to extend through a space between said tape hook pin and said reel hubs; and a cleaning agent applying means arranged in the cassette at a position to apply a cleaning agent to said endless tape while the tape is in motion, said endless tape having a slack length corresponding to an amount of tape drawn out from a cassette in a tape loading mode, said endless tape being guided by said reels to travel smoothly in said cassette when said endless tape is driven, the slack being absorbed at high speed around said reel hubs by said tape hook pin in a tape unloading mode.

* * * * *